United States Patent [19]

Judge

[11] Patent Number: 5,375,332
[45] Date of Patent: Dec. 27, 1994

[54] HAMMER DRIVEN DOUBLE CUT SHEAR DEVICE

[76] Inventor: Peter J. Judge, 2163 S. 500 East, Salt Lake City, Utah 84106

[21] Appl. No.: 194,969

[22] Filed: Feb. 14, 1994

[51] Int. Cl.⁵ .............................................. B25D 3/00
[52] U.S. Cl. ................................ 30/366; 30/167.1; 30/168; 30/315
[58] Field of Search .................. 30/366, 167, 167.1, 30/168, 314, 294, 314, 315, 279.2

[56] References Cited

U.S. PATENT DOCUMENTS

| | | | |
|---|---|---|---|
| 442,670 | 12/1890 | Swan | 30/167 |
| 860,544 | 7/1907 | Howell . | |
| 860,545 | 7/1907 | Howell | 30/167.1 |
| 861,498 | 7/1907 | Brown | 30/167 |
| 1,280,786 | 10/1918 | McConnell | 30/167 |
| 2,255,196 | 9/1941 | Taylor | 30/168 |
| 2,285,386 | 6/1942 | Atwood | 30/314 |
| 2,630,627 | 9/1949 | Beck | 30/168 |
| 2,670,535 | 3/1954 | Ogden | 30/314 |
| 4,520,564 | 6/1985 | Wivinis | 30/168 |
| 4,631,769 | 12/1986 | White | 30/366 |
| 4,813,134 | 3/1989 | Buffin | 30/294 |

*Primary Examiner*—Richard K. Seidel
*Assistant Examiner*—Hwei-Siu Payer
*Attorney, Agent, or Firm*—Henderson & Sturm

[57] ABSTRACT

A hammer driven double cut shear device (10) for punching and cutting sheet metal in a precision fashion; wherein the device (10) includes a handle unit (11) having a punching blade (33) projecting outwardly from one side of the handle unit (11) a cutting blade (32) depending downwardly from the handle unit (11) and a hammer impact surface (25) projecting outwardly from the opposite side of the handle unit (11).

8 Claims, 3 Drawing Sheets

HAMMER DRIVEN DOUBLE CUT SHEAR DEVICE

TECHNICAL FIELD

This invention relates to the field of sheet metal cutting tools in general, and in particular to a dual cutting edge hand tool having a first cutting surface to penetrate the sheet metal and a second cutting surface to elongate the initial cut along a desired path.

BACKGROUND ART

This invention was the subject matter of Document Disclosure Program Registration No. 331,121 which was filed in the United States Patent and Trademark Office on May 17, 1993.

As can be seen by reference to the following U.S. Pat. Nos. 860,544; 4,813,134; 4,520,564; and 2,630,627; the prior art is replete with myriad and diverse specialized tools for penetrating different mediums such as sheet metal, wood and the like.

While all of the aforementioned prior art constructions are more than adequate for the basic purpose and function for which they have been specifically designed, these patented construction are woefully inadequate for the purpose of penetrating and severing sheet metal along a prescribed line or contour.

In addition, none of the aforementioned prior art devices employs an integrally formed cutting bit head having two spaced cutting surfaces that respectively perform the penetrating and controlled severing of the sheet metal necessary to produce a precise cutting pattern which is virtually impossible with any other type of tool.

As a consequence of the foregoing situation, there has existed a longstanding need among workers in the sheet metal industry for a rugged yet simple to use double-cut tool which may be employed in conjunction with an impact tool such as a hammer to make quick precision cuts in a sheet of sheet metal; and, the provision of such a construction is a stated objective of the present invention.

DISCLOSURE OF THE INVENTION

Briefly stated, the hammer driven double cut shear device that forms the basis of the present invention comprises in general a hollow handle unit and a replaceable bit unit that is dimensioned to be received and removeably secured within the hollow handle unit.

In addition, the handle unit itself contains some novel structural features namely: an outer handle grip cover; a layered hammer impact target; and a handle core that has intersecting passageway formed therein to accommodate the replaceable bit unit.

As will be explained in greater detail further on in the specification, the construction, interaction and cooperation between the handle unit and the bit unit combine to produce both a unique and imminently practical tool for sheet metal workers that will simplify their tasks tremendously.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
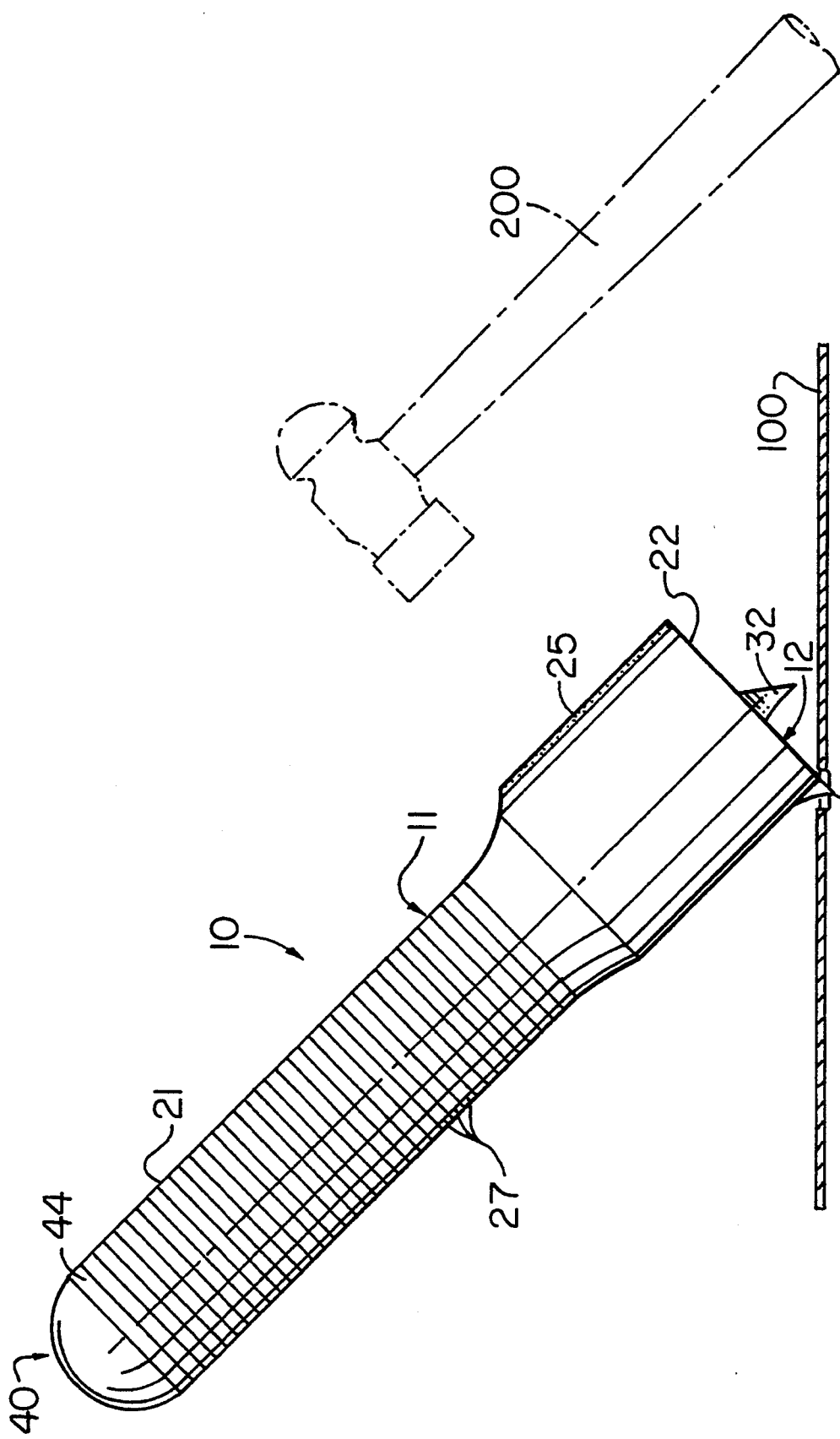
FIG. 1 a perspective view of the device that forms the basis of the present invention employed in its intended environment.

As can be seen by reference to the drawings, and in particular to FIG. 1, the hammer driven double-cut shear device that forms the basis of the present invention is designated generally by the reference numeral (10). The double-cut shear device comprises in general, a handle unit (11) and a replaceable bit unit (12). These units will now be described in seriatim fashion.

Figure 2:
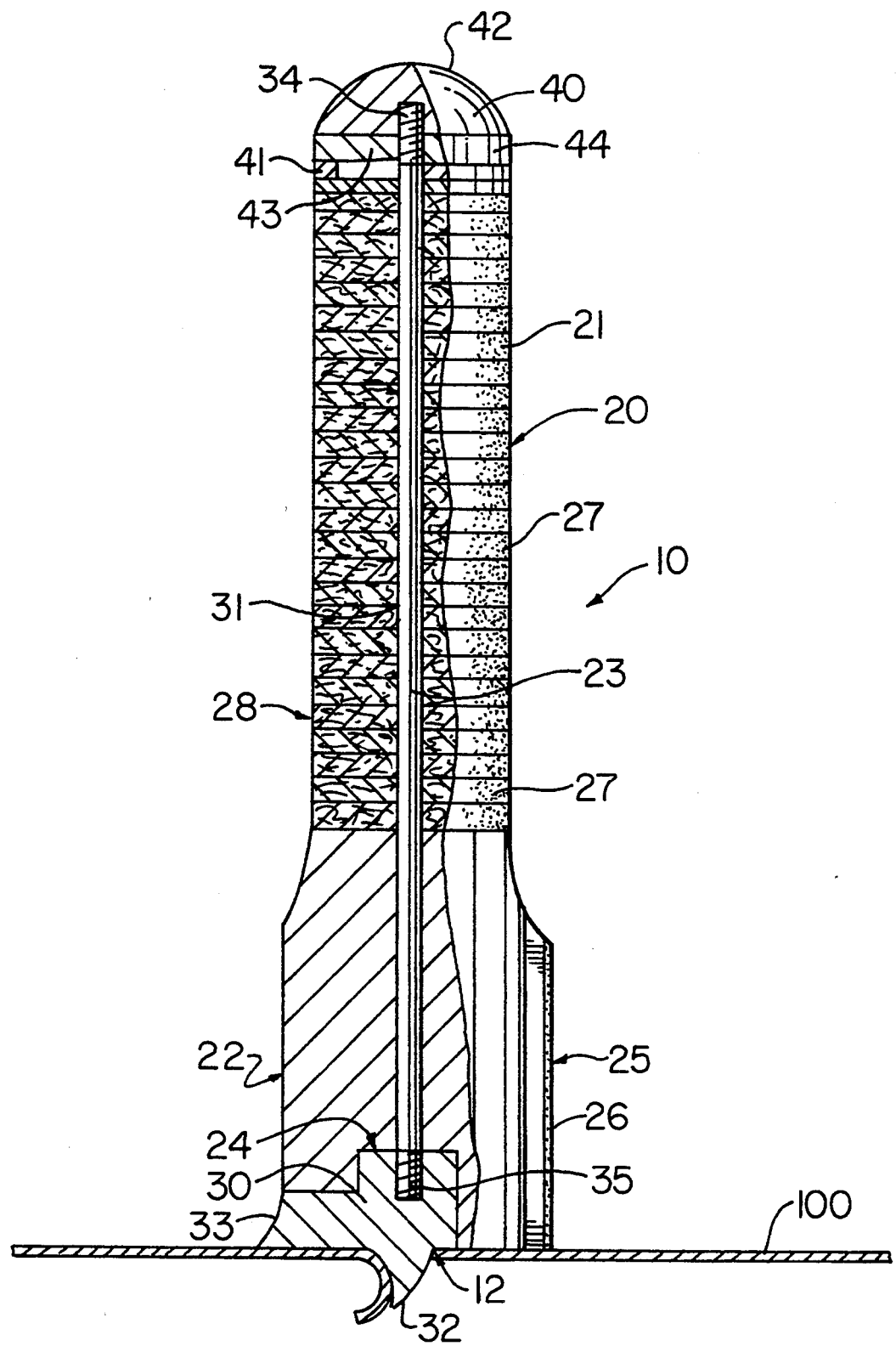
FIG. 2 a partial cross-sectional view of the device.

As shown in FIG. 2, the handle unit (11) comprises in general, an elongated hollow core member (20); wherein, the core member (20) includes a reduced diameter elongated stem portion (21) on one end and an enlarged diameter head portion (22) on the other end.

In addition, as can be seen by reference to FIGS. 2 and 3, the core member (20) is provided with a central bore (23) which extends along the longitudinal axis of the core member (20); and the enlarged head portion (22) of the core member (20) is provided with a contoured radially aligned slot (24) which intersects with the central bore (23) and whose purpose and function will be described in greater detail further on in the specification.

Still referring to FIG. 2, it can be seen that the enlarged head portion (22) of the core member is further provided with an outwardly projecting generally flat hammer impact surface (25) which is disposed in a diametrically opposed fashion to the radially aligned slot (24) in the enlarged head portion (22) of the core member (20); and, in the preferred embodiment of this invention the hammer impact surface (25) is also provided with one or more layer of sound deadening material (26) such as rubber or leather, to reduce the noise levels associated with the use of this device.

As can also be seen by reference to FIG. 2, an elongated threaded rod member (31) in the core member is dimensioned to pass through the center of a plurality of flexible washer elements (27) preferably fabricated from leather or rubber, to produce a high friction handle gripping surface, designated generally as (28) for the handle unit (11).

Figure 3:
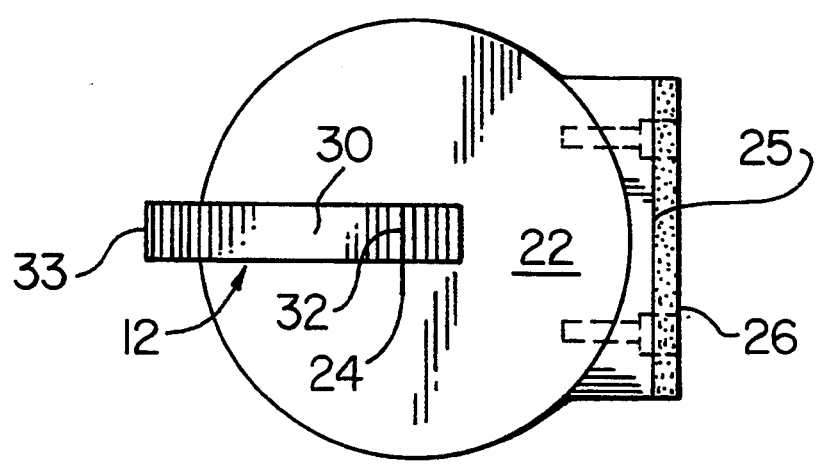
FIG. 3 a bottom view of the device.

As shown in FIGS. 2 and 3, the replaceable bit unit (12) comprises in general, a bit head member (30) and an elongated threaded rod member (31). The bit head member (30) is dimensioned to be received in the contoured radially aligned slot (24) in the enlarged head portion (22) of the core member (20); and, further provided with one cutting blade (32) which projects downwardly from the bit head member (30) and depends downwardly from the enlarged head portion (22) of the handle unit (11). In addition, the bit head member (30) is also provided with a piercing blade (33) which projects outwardly from the bit head member (30) and extends outwardly from the radially aligned slot (24), for reasons that will be explained presently.

As can also be seen by reference to FIG. 2, the elongated rod member (31) is threaded on both its upper and lower ends (34)(35); wherein, the lower end (35) of the rod member (31) is dimensioned to be threadedly engaged in a threaded aperture (not shown) disposed in the top of the bit head member (30); and wherein the upper end (34) of the rod member (31) is dimensioned to be threadedly received in another threaded aperture (not shown) formed in a cap element (40) that cooperates with a locking washer (41) to secure the stack of resilient washer elements (27) to the handle unit (11) of the device in a well-recognized manner.

In addition, as shown in FIG. 2, the top (42) of the cap element (40) is rounded to provide a better grip for the users hand and the lower periphery (43) of the cap element (40) is provided with flat lands (44) to facilitate the grasping of the cap element (40) by a hand tool such as a wrench or the like to effect the replacement of the replaceable bit head member (30) when necessary.

As depicted in FIG. 1, the device (10) is designed to fill a specific void in the sheet metal working industry by providing a tool that can both pierce and cut sheet metal (100) sequential operations; wherein, the device (10) is first disposed at a 45° angle and forced downwardly such that the piercing blade (33) will penetrate the sheet metal at a chosen location. Then, the cutting blade (32) is inserted into the initial opening formed by the piercing blade (33) and a hammer (200) is used to strike the hammer impact surface (25) to move the cutting blade (32) along a desired path; wherein, the piercing blade (33) is used as a directional pointer to guide the device (10) as it severs the sheet metal (100) in accordance with a preferred pattern.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A hammer driven double cut shear device for penetrating and cutting a piece of sheet metal, wherein the device comprises:
    a handle unit including an elongated stem portion and an enlarged head portion;
    a cutting blade depending downwardly from the enlarged head portion;
    a penetrating blade projecting outwardly from one side of the enlarged head portion; and a generally flat hammer impact surface which projects outwardly from the side of the enlarged head portion opposite from where the penetrating blade projects.

2. The device as in claim 1; wherein the axis of the penetrating blade is disposed perpendicular to the said hammer impact surface.

3. The device as in claim 2; wherein; the said hammer impact surface is covered with a layer of resilient material.

4. A hammer driven double cut shear device for penetrating and cutting a piece of sheet metal, wherein the device comprises:
    a handle unit including an elongated stem portion and an enlarged head portion;
    a cutting blade depending downwardly from the enlarged head portion; and
    a penetrating blade projecting outwardly from one side of the enlarged head portion; wherein said head portion has a slot and the blades are formed integrally with a replaceable bit head member disposed within the slot.

5. The device as in claim 4; further comprising an elongated threaded rod member which is secured on one end to said bit head member.

6. The device as in claim 5; further including a plurality of resilient washer elements which are dimensioned to surround the elongated threaded rod member.

7. The device as in claim 6; further including a cap member that is threadedly engaged to the other end of said elongated rod member to captively engage the resilient washer elements.

8. The device as in claim 7; further including a locking washer interposed between said cap member and the uppermost of the resilient washer elements.

* * * * *